Sept. 11, 1962 G. H. ARTHUR 3,053,330
HYDRAULICALLY OPERATED POWER SWIVEL
Filed Jan. 18, 1961 2 Sheets-Sheet 2

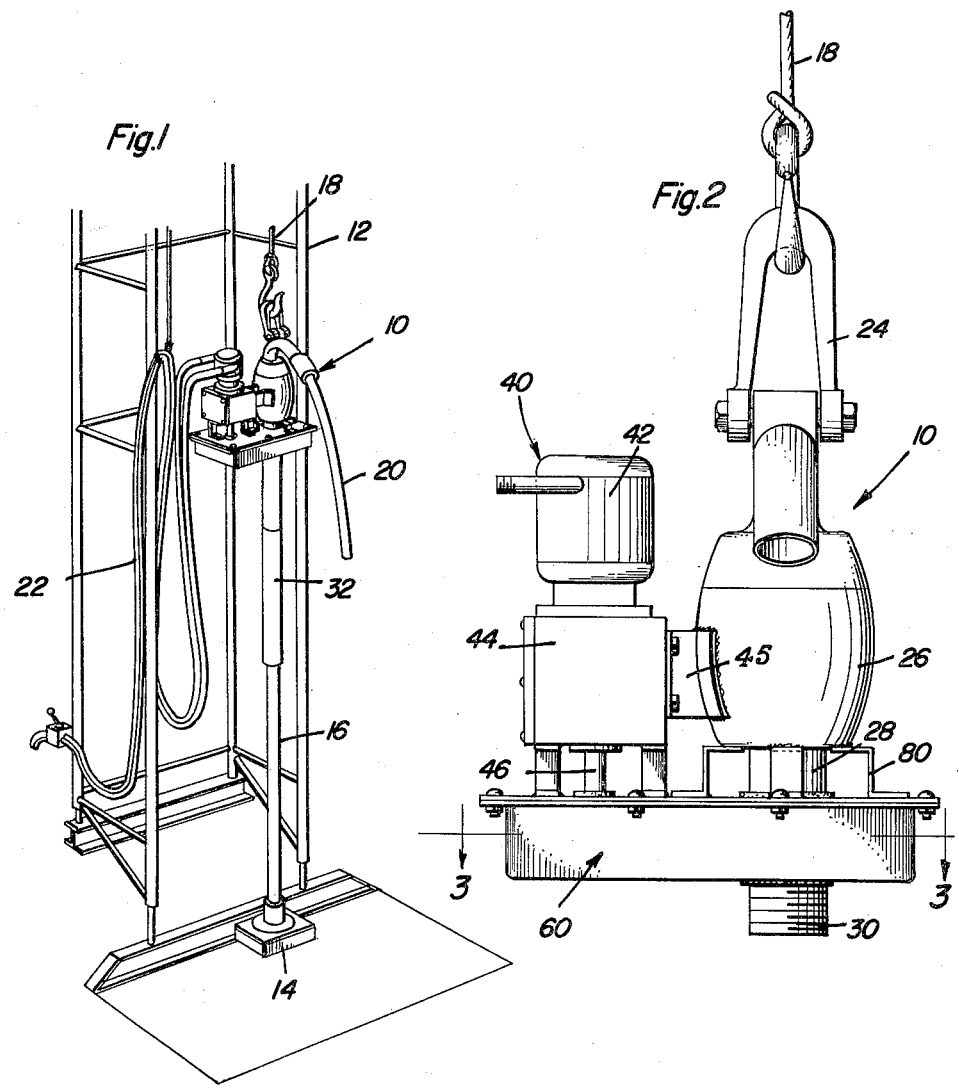
Sept. 11, 1962 G. H. ARTHUR 3,053,330
HYDRAULICALLY OPERATED POWER SWIVEL
Filed Jan. 18, 1961 2 Sheets-Sheet 1
Glen H. Arthur
INVENTOR.

Glen H. Arthur
INVENTOR.

BY
Attorneys

United States Patent Office 3,053,330
Patented Sept. 11, 1962

3,053,330
HYDRAULICALLY OPERATED POWER SWIVEL
Glen H. Arthur, P.O. Box 1545, Alice, Tex.
Filed Jan. 18, 1961, Ser. No. 83,474
6 Claims. (Cl. 175—170)

This invention comprises a novel and useful hydraulically operated power swivel and more particularly relates to a power operated swivel especially adapted for use with oil wells and providing a source of power mounted upon the swivel casing or a sub and connected to the swivel shaft or a sub in a manner to permit controlled independent rotation of the swivel shaft and of a rod or pipe string attached thereto.

There have been heretofore provided various types of hydraulically powered swivels whereby a fluid pressure operating motor is operatively connected to the swivel shaft for effecting rotation of the latter and of any elements connected to the swivel shaft. The purpose of the present invention is to improve devices of this character and to provide a much superior means for operatively connecting the source of power to the swivel shaft.

It is therefore the primary object of this invention to provide an efficient and advantageous connecting means whereby a drive means may be operatively connected to the swivel shaft in a greatly improved manner.

A further object of the invention is to provide a power operating mechanism for a swivel which shall be carried entirely by the latter and shall be effective to transmit power from the drive means to the swivel shaft in an improved manner.

A further and more specific object of the invention is to provide an arrangement whereby a fluid pressure operated motor together with a reduction gearing assembly connected to and driven thereby may be mounted and supported upon the side of a swivel casing and whereby power supplied from the reduction gearing assembly may be applied to the swivel shaft by a compact and highly efficient mechanism.

Still another object of the invention is to provide a device in accordance with the preceding objects wherein the means connecting the power drive means to the swivel shaft shall be enclosed and housed in a protective housing in an improved manner and which housing shall have an oil tight seal with the drive means and the swivel shaft.

A further and very important specific object of the invention is to provide a power operating means for a swivel wherein the advantages of a sprocket chain drive may be advantageously applied to the swivel shaft for effecting rotation of the latter and whereby the sprocket chain drive shall be protectively housed in an enclosing casing in an oil tight manner whereby to insure and maintain adequate lubrication of the sprocket chain mechanism.

Still another object of the invention is to provide a device in accordance with the immediately preceding object of the invention whereby the sprocket chain housing may have its lower portion readily removed in order to obtain access to the sprocket chain mechanism therein without the necessity for disturbing the mounting of the housing upon the swivel casing or upon the reduction gearing assembly component of the drive means.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view showing a portion of a well drilling or servicing rig and the manner in which the power operating mechanism of this invention is applied to the swivel of the rig;

FIGURE 2 is a side elevational view upon an enlarged scale showing the hydraulically operated power swivel in accordance with this invention;

Figure 3:
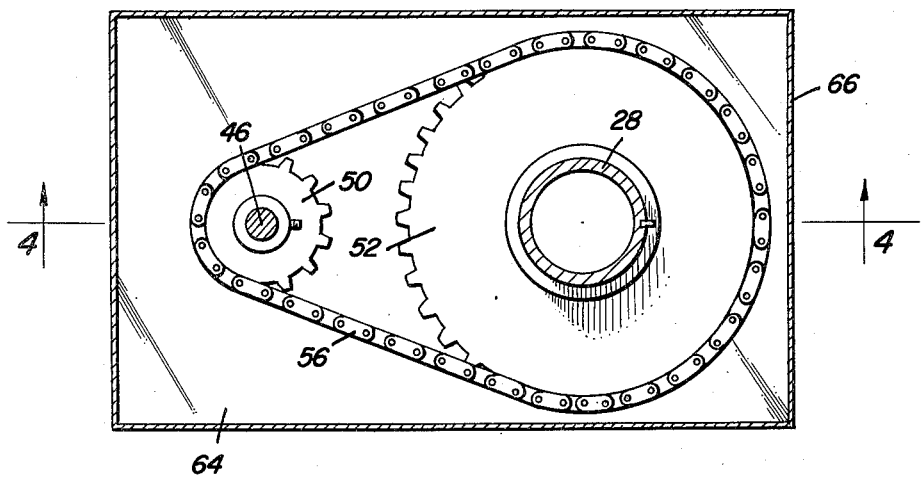
FIGURE 3 is a horizontal sectional view taken upon an enlarged scale substantially upon the plane indicated by the section line 3—3 of FIGURE 2 and showing in particular the arrangement of the sprocket gear mechanism by which the drive means is connected to the swivel shaft.
Figure 4:
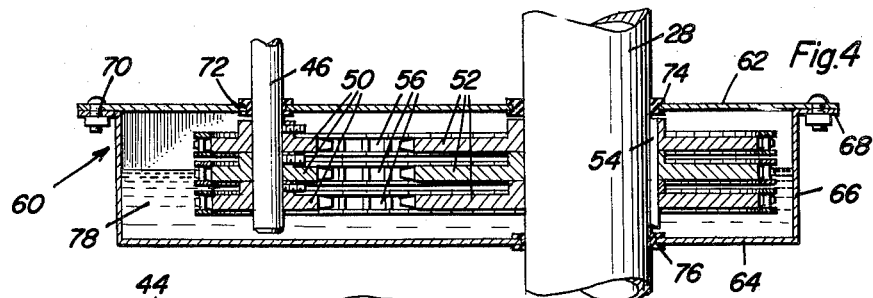
Figure 5:
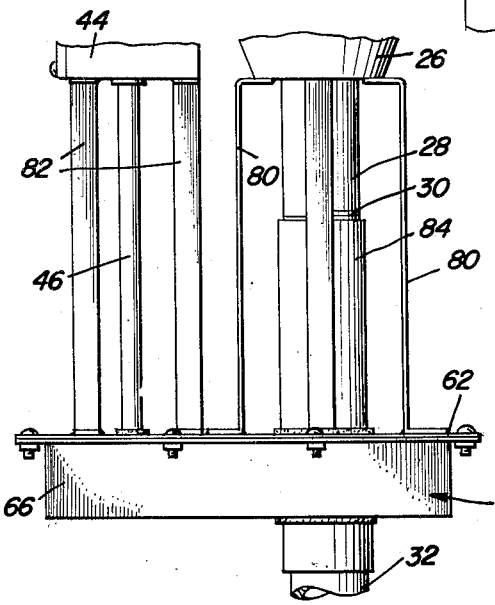

FIGURE 4 is a vertical transverse sectional view taken substantially upon the plane indicated by section line 4—4 of FIGURE 3 and showing further details of the enclosing housing of the sprocket chain connecting mechanism; and FIGURE 5 is a detailed view showing upon an enlarged scale and in elevation the mounting or support means by which the sprocket chain lubricating housing is mounted upon the swivel casing and the reduction gearing assembly component of the drive means.

In the accompanying drawings, referring first to FIGURE 1, it will be observed that the numeral 10 designates generally the power operating swivel having the principles of this invention applied thereto. The numeral 12 indicates a portion of the drilling or working rig associated with the swivel while the numeral 14 indicates a rotary table to which the usual kelly 16 or other rod to be rotated and which is supported by the swivel is driven. Shown at 18 is a cable by which the swivel is supported, the mud circulating hose 20 being also illustrated by means of which mud is circulated through the drilling string and through the swivel supporting the same in the usual manner.

The numeral 22 indicates a flexible conduit system by which the fluid pressure such as a hydraulic fluid from any suitable source, not shown, is supplied to the power operating means for the swivel in accordance with this invention.

Referring now especially to FIGURE 2 it will be observed that the swivel 10 includes the usual supporting bail 24 attached to the swivel housing or casing 26 and by which the latter is supported from the cable 18. The swivel casing and in fact the swivel structure is of a conventional known design and therefore detailed description of the same is believed to be unnecessary for the purposes of this invention. It suffices for an understanding of the manner in which this invention is applied to the swivel to note that a swivel shaft 28 is rotatably journalled and supported in the swivel and has a projecting extremity 30 which may be threaded or the like whereby a conventional coupling or sub-assembly, such as that indicated at 32 in FIGURE 1, may be detachably connected thereto and in turn may support the kelly 16 or other rod to be driven. As used hereinafter in the specification and claims any element connected to the swivel shaft and supported thereby is referred to as a rod or pipe. Ordinarily the drill string or other string of pipes supported by the swivel is rotated by means of the conventional rotary table and the kelly bar 16 slidably passing therethrough. In some instances, however, it is highly desirable to provide a means whereby power may be directly applied to the swivel shaft or a sub connected thereto in order to effect rotation of the swivel shaft and any rod carried thereby without the necessity for employing the rotary table for this purpose. It is for the purpose of providing a mechanism to perform such a function that the present invention is designed.

Indicated generally by the numeral 40 is a drive means by which rotation may be given to the swivel shaft. This drive means preferably comprises any conventional type of power source such as a fluid pressure motor 42 which may be supplied with a suitable fluid under pressure by the previously mentioned conduits 22. This motor in turn is firmly attached to and is operatively connected to a reduction gearing assembly indicated generally by the numeral 44. Conveniently the reduction gearing assembly includes a casing which is rigidly mounted as by a mounting bracket 45 to the side of the swivel casing 26. Thus the reduction gearing assembly constitutes the sole support for the motor 42 and is mounted directly upon the side of the swivel casing 26 in spaced relation thereto in a rigid manner as shown.

Inasmuch as the particular reduction gearing assembly may be of any known and conventional design, and since the invention claimed does not depend upon any particular construction of gearing assembly for this purpose, the details of the reduction gearing assembly have been omitted as being superfluous for an understanding of the invention set forth and claimed herein. However, such assembly has a power delivery shaft 46 projecting downwardly from the lower end thereof and in substantial parallel relation to the swivel shaft 28. A connecting means is provided whereby the power delivery shaft 46 of the drive means 40 is operatively connected to the swivel shaft 28 in a highly effective and improved manner. This connecting means consists of a plurality of driving sprocket gears 50 which are fixedly secured in side-by-side relation to the lower end of the drive shaft 46 and a plurality of corresponding driven sprocket gears 52 which are secured as by a spline 54 upon the swivel shaft 28. The series of sprocket chains 56 connect each of the driving sprocket gears 50 to a corresponding driven sprocket gear 52 as will be readily apparent from FIGURE 3. As shown, it is preferred that the driven sprocket gear shall be of larger diameter than the driving sprocket gears in order to effect a further speed reduction between the driving means and the swivel shaft. Any desired number of sprocket chains and sprocket gears may be provided and in some instances it may be necessary to vary in a given installation the number of such connecting units in accordance with the power required to effect rotation of the swivel shaft and the pipe or rod string carried thereby.

A lubricant housing indicated generally by the numeral 60 encloses the connecting means to maintain lubrication for the same, to protect the connecting means against unnecessary wear or damage and to also act as a guard to prevent the connecting means from inadvertently contacting and injuring adjacent persons or objects. This lubricant housing consists of a generally flat upper plate comprising a base plate or mounting plate 62 together with a lower pan having a bottom wall 64 and an upstanding side wall 66 with outturned flange 68 thereon which through the medium of fastening bolt 70 may be detachably secured to the base or mounting plate 62. Openings are provided in the top and bottom walls 62 and 64 of the lubricant housing 60 to permit passage of the power shaft 46 and the swivel shaft therethrough. Thus, as shown in FIGURE 4, the power shaft 46 extends through the top wall 62 and terminates within the housing 60 and there is provided a fluid tight lubricant sealing or packing means as at 72 which surrounds the shaft 46 and prevents the possibility of fluid leakage between the shaft and the top wall of the housing. In a similar manner further packing means as at 74 and 76 surround the swivel shaft 28 where it passes through the openings in the top and bottom walls 62 and 64 to perform the same purpose. In this manner the lubricant housing 60 is rendered fluid tight to retain therein a quantity of lubricant as indicated at 78 in which at least some of the sprocket chain connecting units are immersed to effect lubrication of the same and thus insure smooth and long lived operation of the device.

The lubricant housing 60 is detachably supported from the underside of either the swivel housing 26, the reduction gear assembly 44 or both. Thus, as will be best apparent from FIGURES 2 and 5, a plurality of mounting brackets 80 are provided which are rigidly secured to the underside of the housing 26 of the swivel and to the upper side of the base or mounting plate 62 to thereby support the lubricant housing 60 below and in spaced relation to the swivel housing. A further set of brackets 82 serve a similar function for connecting the lubricant housing to the underside of the casing of the reduction gearing assembly 44. It will be understood that the lubricant housing 60 by its connection to the swivel casing and to the reduction gear assembly 44 serves to assist the mounting means 45 in rigidly connecting these elements into a rigid assembly.

As shown best in FIGURE 5 it will be observed that the swivel shaft 28 may terminate above the lubricant housing and the connecting means previously described. In that event a sub or connecting sleeve 84 would have its upper end engaged upon the threads 30 of the swivel shaft 28 and its lower end in turn would receive the upper end of the rod 32. This construction has the advantage that the keyway 54 by means of which the driven sprocket gears are mounted can be formed in the connecting sleeve or sub 84 rather than upon the swivel shaft 28. It is within the principles of the invention however to form or provide the driven sprocket gears as desired either upon the swivel shaft directly or upon some elements such as the sleeve 84 connected thereto as may be found to be most expedient and convenient.

The sprocket gear connecting means by which the drive means is associated with the swivel shaft possesses numerous advantages over conventional gearing connections including a power source and a swivel shaft. Thus, the sprocket chain drive enables a much wider range of spacing between the power input shaft 46 and the swivel shaft 28 than can be accommodated in a practical manner by a direct gear connection therebetween. Still further, the sprocket gear drive means provides a much more flexible connection which will more readily accommodate any misalignments of the shaft 46 with respect to the shaft 28. Still further, a sprocket chain drive is considerably more flexible and shock resistant and less liable to be damaged by shocks and jars then would be the case with a direct gear connection which would permit practically no yielding or loss motion in the connector means.

For convenience of illustration, the power drive means has been specifically disclosed as being mounted upon the swivel housing and as being connected to the swivel shaft 28. It is contemplated and intended, however, that the power assembly including the fluid motor and the reduction gear assembly may be both or either mounted upon a swivel sub assembly such as 32; and the driving connection may be made to the swivel shaft or the sub shaft as desired.

The power swivel assembly is freely movable and swingable horizontally when not operating. In operation, any conventional torque reacting means, not shown, will be employed to prevent horizontal rotation of the assembly, as shown in the Patent No. 2,612,347 to S. Sirocusa.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A power operated swivel assembly for the rotary drilling of deep wells, comprising
   (a) a vertically disposed casing supported solely at its upper end for vertical travel and for free horizontal swinging movement during periods of non-operation, and a source of drilling fluid under pressure,
   (b) a vertical shaft rotatably journaled in said casing,
   (c) said shaft having an upper end and a lower end exposed at the underside of said casing for connection to a vertical hollow drill pipe therebeneath which is to be rotated thereby,
   (d) said shaft being tubular and freely communicating at its upper end with said source of fluid for circulation therethrough and into said pipe of drilling fluid supplied to said shaft by the drilling fluid circulating system of a rotary drilling apparatus,
   (e) drive means including a motor carried by said casing and supported solely from the latter,
   (f) connecting means for drivingly and continuously connecting said drive means to said vertical shaft for rotation,
   (g) said connecting means comprising driving and driven sprockets disposed for rotation upon parallel axes and connected respectively to said drive means and to said vertical shaft,
   (h) and a horizontally disposed sprocket chain directly connecting said driving and driven sprockets whereby to effect rotation of said vertical shaft by said driven means,
   (i) said drive means including a reduction gearing assembly secured to said motor.

2. The combination of claim 1 including a housing spaced vertically below and secured to said casing, a tubular vertical sub-shaft journaled in said housing and being interposed between and having its upper and lower ends respectively secured to and establishing communication between said first mentioned shaft and said drill pipe, said connecting means being disposed within said housing.

3. A power operated swivel construction for the rotary drilling of deep wells, comprising
   (a) a vertically disposed casing supported solely at its upper end for vertical travel and for free horizontal swinging movement during periods of non-operation,
   (b) a tubular vertical shaft rotatably journaled in said casing and having its upper end freely communicating with a source of drilling fluid under pressure,
   (c) said shaft having a lower end adapted to be connected to the upper end of a vertical hollow drill pipe for support and rotation of the latter and for the circulation of drilling fluid from said source therethrough,
   (d) drive means for said shaft including a motor having an output shaft,
   (e) said drive means further including a reduction gearing assembly directly connected to said motor output shaft and a connecting assembly disposed beneath said reduction gearing assembly and said shaft thereby establishing driving relation between said reduction gearing assembly and said shaft,
   (f) at least one of said assemblies being disposed beneath said motor and comprising driving and driven sprockets disposed for rotation about parallel vertical axes and a horizontally disposed sprocket chain directly connecting said driving and driven sprockets,
   (g) said reduction gearing assembly being secured to said motor and said connecting assembly whereby to support said motor and said connecting assembly,
   (h) at least one of said sprockets being directly secured to one of said output and vertical shafts.

4. A power unit for rotating a string of drill pipe comprising
   (a) a body supported solely at its upper end for vertical travel and for free horizontal swinging movement during periods of non-operation,
   (b) a tubular vertical shaft rotatably journaled in said body and having open upper and lower ends for respective attachment to and for free communication with a source of drilling fluid under pressure and the upper end of a drill pipe to be supported and rotated thereby,
   (c) drive means including a motor,
   (d) connecting means driven by said drive means and connected to said shaft for rotating the latter from the former,
   (e) said drive means including a reduction gearing assembly receiving power from said motor and being disposed above and delivering power to said connecting means,
   (f) said reduction gearing assembly being mounted on and supported solely by said body and supporting said connecting means,
   (g) said connecting means comprising driving and driven sprockets mounted for rotation about parallel vertical shafts and a horizontally disposed sprocket chain directly connecting said driving and drain sprockets,
   (h) said driven sprocket being directly connected to said tubular shaft, said driving sprocket being directly connected to said reduction gearing assembly.

5. A power operated swivel for the rotary drilling of deep wells, comprising
   (a) a vertically disposed casing supported solely at its upper end for vertical travel and for free horizontal swinging movement during periods of non-operation,
   (b) a source of drilling fluid under pressure,
   (c) a vertical shaft rotatably journaled in said casing,
   (d) said shaft having an upper end terminating in said casing and a lower end exposed at the underside of said casing for connection to a vertical hollow drill pipe therebeneath which is to be rotated thereby,
   (e) said shaft being tubular and freely communicating at its upper end with the casing interior for circulation therethrough and into said pipe of drilling fluid supplied to said casing by the drilling fluid circulating system of a rotary drilling apparatus,
   (f) drive means including a motor disposed at one side of said casing and supported solely from the latter,
   (g) connecting means for drivingly and continuously connecting said drive means to said vertical shaft for rotation,
   (h) said connecting means comprising driving and driven sprockets disposed for rotation upon parallel axes and secured respectively to said drive means and to said vertical shaft,
   (i) and a horizontally disposed sprocket chain directly connecting said driving and driven sprockets whereby to effect rotation of said vertical shaft by said driven means,
   (j) said drive means including a reduction gearing assembly secured to said motor,
   (k) a support means connecting said reduction gearing assembly to said casing and constituting the sole support for said reduction gearing assembly,
   (l) a housing enclosing said connecting means, and disposed in spaced relation to at least one of said drive means and casing.

6. The combination of claim 5 including means mounting and supporting said housing upon both said reduction gearing assembly and said casing.

References Cited in the file of this patent

UNITED STATES PATENTS

| | | |
|---|---|---|
| 2,588,068 | Williams et al. | Mar. 4, 1952 |
| 2,781,185 | Robbins | Feb. 12, 1957 |
| 2,807,441 | Sewell | Sept. 24, 1957 |
| 2,960,311 | Scott | Nov. 15, 1960 |
| 2,969,844 | Hambrick | Jan. 31, 1961 |
| 2,998,084 | Johnson et al. | Aug. 29, 1961 |
| 3,009,521 | Failing | Nov. 21, 1961 |
| 3,012,619 | Farque | Dec. 12, 1961 |
| 3,012,620 | Gaines | Dec. 12, 1961 |

OTHER REFERENCES

"Hydraulic-Powered Drilling Sub for Light Rigs," article by Jacobsen, The Petroleum Engineer, Dec. 1959, pages B-30 and B-31.